(No Model.)
F. A. C. PERRINE.
ELECTRIC CABLE SPLICE.
No. 484,045.  Patented Oct. 11, 1892.
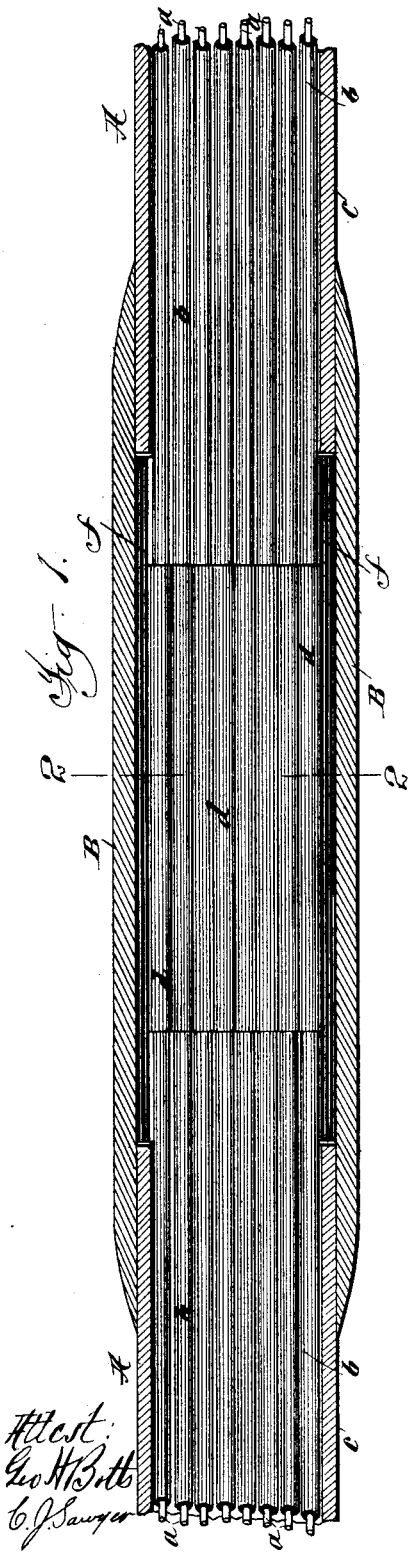
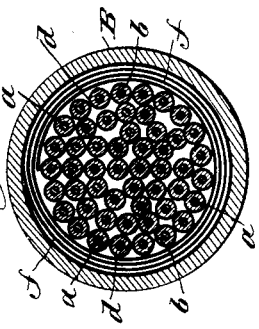
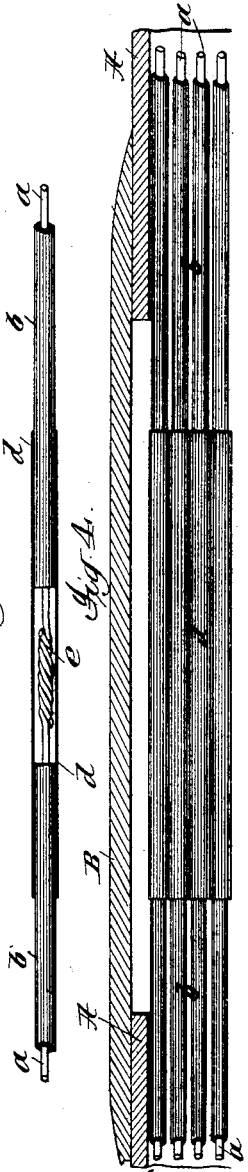
Inventor:
Frederic A. C. Perrine
by
Phelps Munson Phelps Hovey
Attys

UNITED STATES PATENT OFFICE.

FREDERIC A. C. PERRINE, OF TRENTON, NEW JERSEY, ASSIGNOR TO THE JOHN A. ROEBLINGS SONS COMPANY, OF SAME PLACE.

ELECTRIC-CABLE SPLICE.

SPECIFICATION forming part of Letters Patent No. 484,045, dated October 11, 1892.

Application filed June 29, 1891. Serial No. 397,822. (No model.)

*To all whom it may concern:*

Be it known that I, FREDERIC A. C. PERRINE, a citizen of the United States, residing at Trenton, county of Mercer, and State of New Jersey, have invented certain new and useful Improvements in Electric-Cable Splices, fully described and represented in the following specification and the accompanying drawings, forming a part of the same.

The object of the present invention is to provide an improved splice or joint between sections of lead-covered electric cable, and especially to provide a splice of lower electrostatic capacity than those heretofore in use; and my invention consists in the improved splice for electric cables, as particularly described in the following specification, and pointed out in the claims.

Referring to the accompanying drawings, forming a part of this specification, Figure 1 is a longitudinal vertical section of a cable-splice of the preferred form constructed according to my invention. Fig. 2 is a cross-section of the same on the line 2 2 of Fig. 1. Fig. 3 is a detail section of one of the conductors; and Fig. 4 is a view similar to Fig. 1 on a reduced scale, showing a modification.

In said drawings, A is the electric cable, in which the splice is to be formed, the cable consisting of the usual number of conductors $a$, separately insulated by air-containing material, paper, or insulation of any other suitable form. As shown, the conductors $a$ are insulated by a wrapping of paper $b$ and inclosed within the lead casing $c$, the cable being shown as an unfilled or dry-core cable, although it will be understood that the splice is of general application and to filled as well as unfilled cables.

In forming the splice a portion of the lead casing $c$ is removed and the conductors $a$ stripped of their insulation for a sufficient distance to permit of their convenient splicing. A sleeve $d$, preferably of paper, compressed or otherwise constructed so as to be practically non-absorbent, is then slipped over the end of one of each two conductors to be spliced together and slipped back upon the insulation $b$ to uncover the naked part of the conductor. The conductors $a$ are then spliced in the common way, as shown at $e$ in Fig. 3, or in any other suitable manner, and the paper sleeve $d$ is then slipped back into the position shown in that figure, so as to cover the spliced part of the conductors and lap over the insulation. This is the preferred method of making the splice, the sleeves $d$ being previously formed complete and applied over the ends of the conductors before splicing; but the sleeves may be applied in any other suitable manner. All the conductors having been thus spliced and covered by a paper sleeve $d$, a sleeve $f$ is then placed about the grouped conductors forming the cable, this sleeve being preferably applied by wrapping a sheet of compressed paper about the cable in several folds, as shown in Figs. 1 and 2. The cable is then completed by applying outside the splice in any suitable manner the lead casing B, which laps over the cut ends of the cable A and forms with the casing $c$ a continuous air-tight and waterproof casing.

While I prefer to apply the non-absorbent sleeve $f$, as shown in Figs. 1 and 2, this sleeve may be omitted and the casing applied directly outside the sleeves $d$, as shown in Fig. 4.

It will be seen that my splice is simple and easy to make and that I secure a splice in which the insulation is practically that of a dry-core cable and its electrostatic capacity correspondingly low. The sleeves covering the separate conductors and that about the group of conductors, being of non-absorbent material, contain no moisture, so that the use of a hot saturating or filling mixture in cable-splicing is avoided.

While I prefer to make the sleeves of non-absorbent paper, as above stated, it is evident that they may be made of other non-absorbent material. Thus in place of paper I may use vulcanized fiber, vulcanite, or other similar material. Paper or vulcanized fiber, however, is preferable to vulcanite, as the former are not affected by heat.

What I claim is—

1. An unfilled electric cable-splice having each spliced conductor surrounded by a sleeve of non-absorbent paper or similar non-absorbent material and having a casing outside the group of spliced conductors, substantially as described.

2. An unfilled electric-cable splice having each spliced conductor surrounded by a sleeve of non-absorbent paper or similar non-absorbent material and having a covering of non-absorbent paper or similar non-absorbent material about the group of spliced conductors and an outside casing, substantially as described.

In testimony whereof I have hereunto set my hand in the presence of two subscribing witnesses.

FREDERIC A. C. PERRINE.

Witnesses:
DANIEL H. FREAS,
W. H. GANDY.